United States Patent
Chirco et al.

(10) Patent No.: US 6,862,639 B2
(45) Date of Patent: Mar. 1, 2005

(54) COMPUTER SYSTEM INCLUDING A RECEIVER INTERFACE CIRCUIT WITH A SCATTER POINTER QUEUE AND RELATED METHODS

(75) Inventors: Antonio Ignatius Chirco, Melbourne, FL (US); James Marcus Cox, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 496 days.

(21) Appl. No.: 10/095,193

(22) Filed: Mar. 11, 2002

(65) Prior Publication Data

US 2003/0172202 A1 Sep. 11, 2003

(51) Int. Cl.$^7$ ............................................... G06F 13/37
(52) U.S. Cl. .................... 710/112; 710/115; 710/111; 370/424
(58) Field of Search ........................... 370/395.41, 412, 370/424; 710/52, 54, 111, 112, 115; 711/150, 167, 170, 202, 208, 219, 220

(56) References Cited

U.S. PATENT DOCUMENTS

| | | | |
|---|---|---|---|
| 5,016,248 A | * | 5/1991 | Kudoh ........................ 370/413 |
| 5,610,914 A | * | 3/1997 | Yamada .................. 370/395.72 |
| 5,765,023 A | | 6/1998 | Leger et al. |
| 5,781,799 A | | 7/1998 | Leger et al. |
| 5,873,089 A | * | 2/1999 | Regache ..................... 707/100 |
| 5,875,472 A | * | 2/1999 | Bauman et al. ............. 711/150 |
| 5,940,404 A | | 8/1999 | Delp et al. |
| 6,192,461 B1 | * | 2/2001 | Williamson et al. .......... 712/23 |

* cited by examiner

Primary Examiner—B. James Peikari
(74) Attorney, Agent, or Firm—Allen, Dyer, Doppelt, Milbrath & Gilchrist, P.A.

(57) ABSTRACT

A computer system may include a processor, at least one memory coupled to the processor and having a plurality of scattered memory locations each having a pointer associated therewith, and a receiver interface circuit coupled to the at least one memory. The receiver interface circuit may include a scatter pointer queue for storing available pointers corresponding to available scattered memory locations. The scatter pointer queue may also store unavailable pointers corresponding to unavailable scattered memory locations. The receiver interface circuit may also include a receiver for receiving the data and writing the received data to the available scattered memory locations based upon the available pointers in the scatter pointer queue.

30 Claims, 3 Drawing Sheets

COMPUTER SYSTEM INCLUDING A RECEIVER INTERFACE CIRCUIT WITH A SCATTER POINTER QUEUE AND RELATED METHODS

GOVERNMENT LICENSE RIGHTS

The U.S. Government has a paid-up license in this invention and the right in limited circumstances to require the patent owner to license others on reasonable terms as provided for by the terms of contract No. DAAJ09-95-C-A001, awarded by the U.S. Army.

FIELD OF THE INVENTION

The present invention relates to the field of computer systems, and, more particularly, to receiver interface circuits and related methods.

BACKGROUND OF THE INVENTION

Multiple electronic devices, such as computers, for example, are often connected together to form networks. When connected to a network, each computer typically includes transmitter/receiver interface circuitry, such as a network interface controller (NIC), which allows data to be transferred to or from the computer. In the case of data reception, the data being received by the computer is typically stored in non-contiguous buffers located in memory, such as random access memory (RAM), for example. Such data is generally stored in the buffers until it can be processed by the computer's central processing unit (CPU), at which time new data may be written to the buffers.

As the speed and size of data transfer continues to increase, it is becoming increasingly more difficult to quickly and efficiently write received data to memory buffers while keeping track of the addresses at which the data is stored. Typical receiver interface circuits use linked list receiver queues stored in RAM for this purpose. One example of such a prior art design is the 82596 Ethernet controller from the Intel Corporation of Santa Clara, Calif. In this design, buffer descriptors are built in RAM and then linked into a linked list. The receiver interface circuitry follows the linked list and uploads the buffer information from RAM to find the next available buffer.

Another prior art example may be found in U.S. Pat. No. 5,990,404 to Delp et al. entitled "Method and Apparatus for Enhanced Scatter mode Allowing User Data to be Page Aligned." The patent is directed to an adapter to be coupled between a data communications network and a memory. A data packet including protocol header bytes is received from a data communications network by the adapter. A variable amount of data is specified for a first scatter page that contains protocol header bytes. Subsequent sequential pages from the received data packet are transferred by direct memory access (DMA) operations to real page addresses in the memory, with the sequential pages transferred being page aligned in the memory.

Moreover, a page address is written to a DMA list stored in an adapter memory for the sequential pages transferred. A count value is incremented in a packet header of a number of pages transferred for each sequential page transferred. Responsive to transferring a last page from the received data packet, the first scatter page containing the packet header, the DMA list and the protocol header bytes is transferred to a separate address space in the memory.

One drawback of such prior art approaches is that the list of buffer addresses is at some point stored in the system memory (i.e., RAM) of the computer. As a result, the receiver interface circuit must frequently download the address information from the RAM to determine which buffer locations are available for new data being received. The penalty for such data copying increases as the data transfer speed increases. Such prior art devices may therefore not provide adequate performance when used with high speed data sources, such as may be found in Fibre Channel architectures, for example.

SUMMARY OF THE INVENTION

In view of the foregoing background, it is therefore an object of the present invention to provide a computer system including a receiver interface circuit which can relatively quickly and efficiently allow received data to be written to system memory.

This and other objects, features, and advantages in accordance with the present invention are provided by a computer system which may include a receiver interface circuit including a scatter pointer queue. The computer system may include a processor and at least one memory coupled thereto. The at least one memory may have a plurality of scattered memory locations (i.e., buffers) each having a pointer associated therewith. The receiver interface circuit may be coupled to the at least one memory. The receiver interface circuit may include the scatter pointer queue for storing available pointers corresponding to available scattered memory locations. The scatter pointer queue may also store unavailable pointers corresponding to unavailable scattered memory locations. The receiver interface circuit may also include a receiver for receiving data and writing the received data to the available scattered memory locations based upon the available pointers in the scatter pointer queue.

The processor may be coupled to the receiver interface circuit, and the processor may change each unavailable pointer in the scatter pointer queue to an available pointer based upon processing data stored in a respective unavailable scattered memory location. More particularly, the computer system may include a bus coupling the processor, the at least one memory, and the receiver interface circuit together. Also, the scatter pointer queue may be a circular scatter pointer queue, for example. Furthermore, the computer system may further include a direct memory access (DMA) controller coupled to the receiver and the at least one memory for transferring the received data to respective available scattered memory locations.

The receiver interface circuit may include a bus interface circuit coupling the receiver and the scatter pointer queue to the bus. The receiver interface circuit may also include a buffer coupled to the receiver for storing the received data. Moreover, the receiver may include receive logic for receiving the data, and a controller for determining a next available pointer from the scatter pointer queue and writing the received data to an available scattered memory location corresponding to the next available pointer.

In addition, the data may be transmitted in groups, and the receiver may truncate each group of data exceeding a predetermined group size. Alternately, when a group of data exceeds a predetermined group size, the receiver may write the group of data to a plurality of available memory locations. Further, the receiver interface circuit may be implemented in at least one of a field programmable gate array (FPGA) and an application specific integrated circuit (ASIC), for example.

A method aspect of the invention is for writing data to at least one memory including a plurality of scattered memory locations in the at least one memory, and wherein each memory location may have a pointer associated therewith. The method may include storing available pointers corresponding to available scattered memory locations and unavailable pointers corresponding to unavailable memory locations in a scatter pointer queue. The data may be written to the available scattered memory locations based upon the available pointers in the scatter pointer queue.

More particularly, the method may further include changing each unavailable pointer in the scatter pointer queue to an available pointer based upon data stored in a respective unavailable scattered memory location being processed. Also, the scatter pointer queue may be a circular scatter pointer queue. Further, the data may be transmitted in groups, and the method may also include truncating each group of data exceeding a predetermined group size. Alternately, writing may include writing a group of data to a plurality of available memory locations when the group of data exceeds a predetermined group size.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
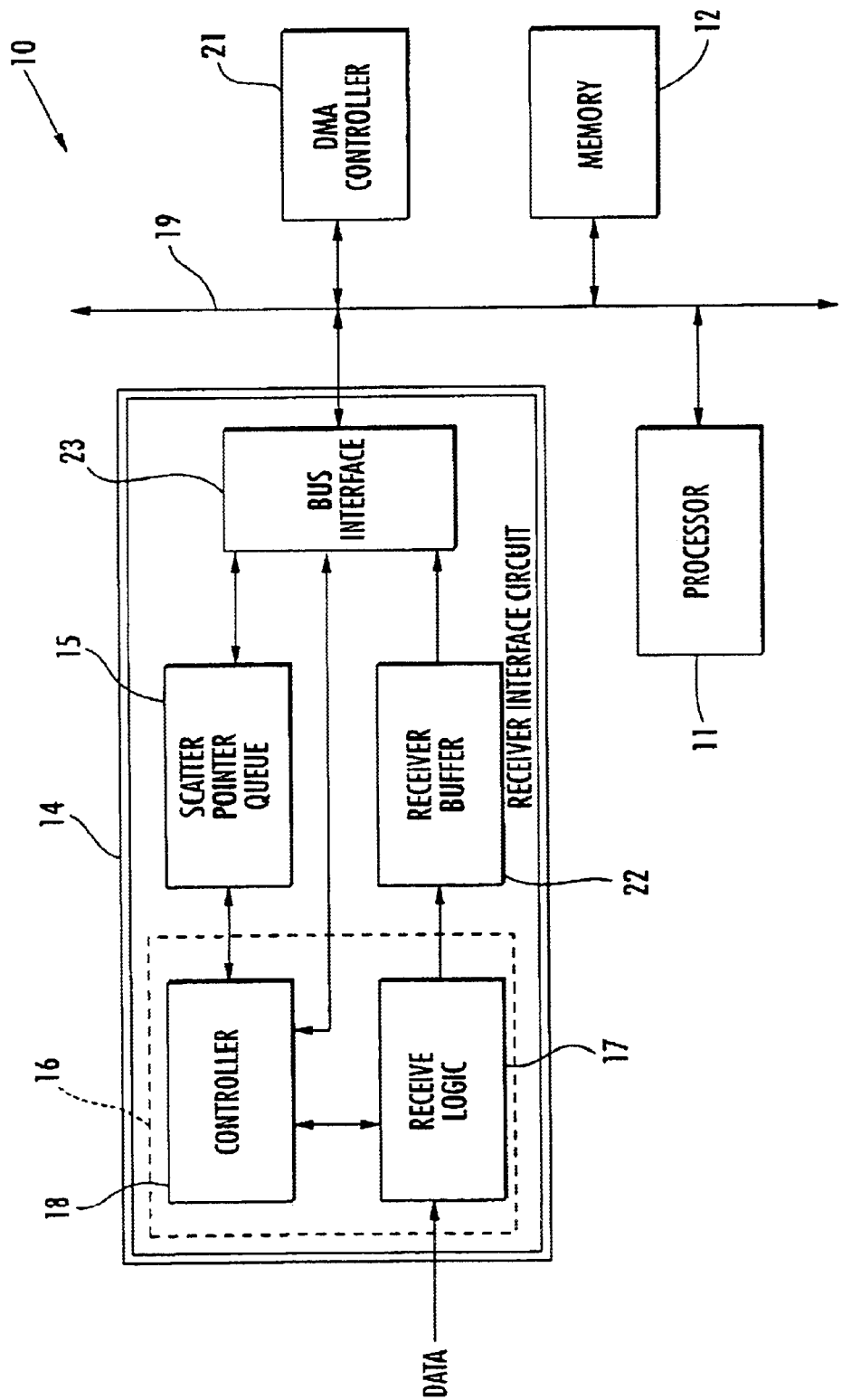
FIG. 1 is schematic block diagram of a computer system according to the present invention.
Figure 2:
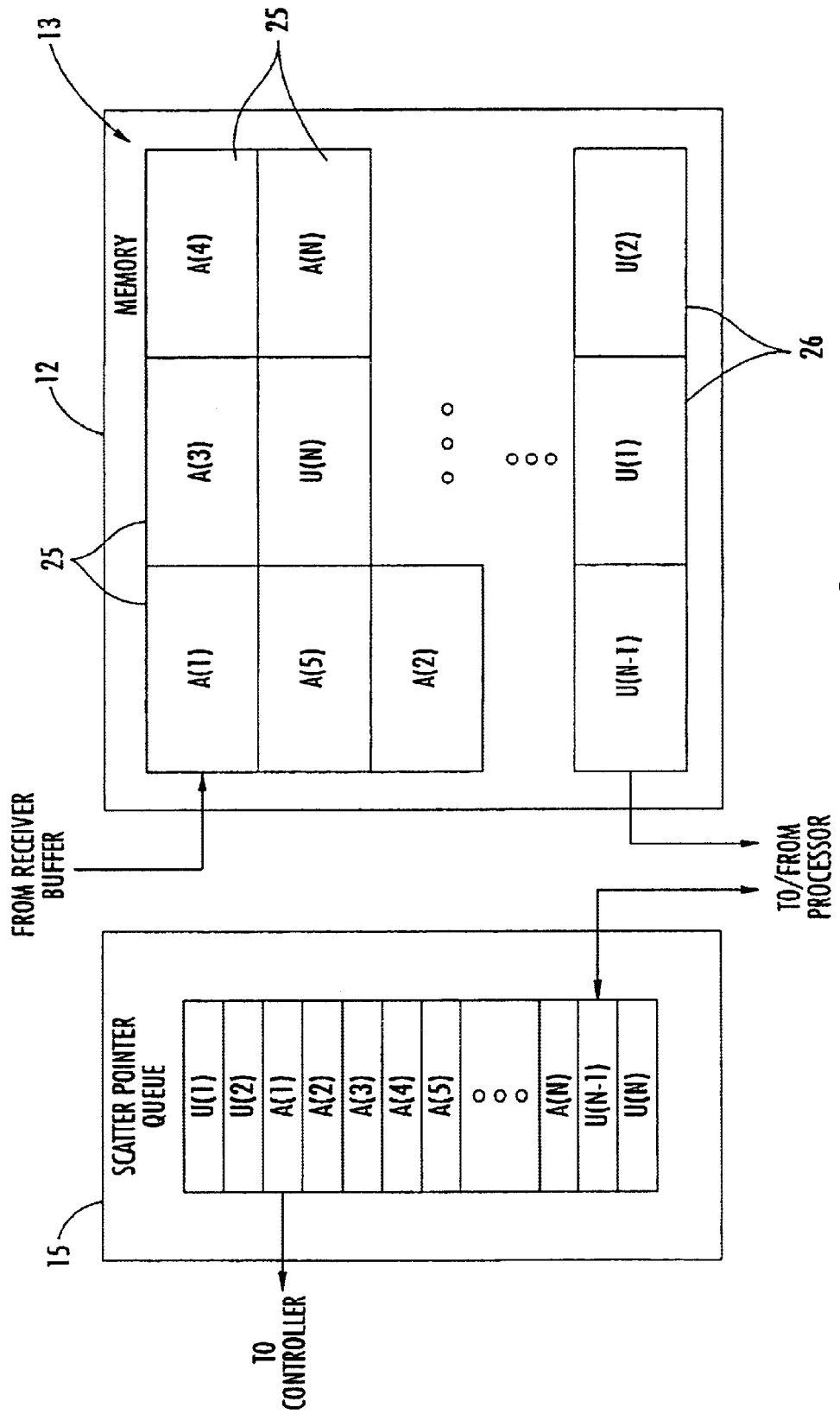
FIG. 2 is a more detailed schematic block diagram of the scatter pointer queue and memory of FIG. 1 and illustrating operation thereof.

Referring initially to FIGS. 1 and 2, a computer system 10 according to the invention illustratively includes a processor 11 (e.g., a central processing unit (CPU)) and at least one memory (e.g., RAM) 12 coupled to the processor, e.g., via a bus 19. The bus 19 may be a peripheral component interconnect (PCI) bus, for example, although other suitable busses or connectors known to those of skill in the art may also be used. The memory 12 has a plurality of scattered memory locations (or buffers) 13 defined therein, each having a pointer associated therewith. For example, the pointers may be digital words corresponding to physical addresses of the memory locations 13 within the memory 12 as would be readily appreciated by those skilled in the art.

The size of the memory locations 13 will generally be determined by the particular format or protocol being used for data transfer. By way of example, according to the Transmission Control Protocol (TCP)/Internet Protocol (IP) data may be transmitted in groups of 8 Kilobytes each. Thus, when using this protocol, the memory locations 13 may each be defined by the processor 11 to be 8 Kilobytes. Of course, the memory locations 13 may be other sizes as well, to accommodate other types of data transfer protocols or formats.

According to the invention, the computer system 10 further includes a receiver interface circuit 14 also coupled to the memory 12 via the bus 19. The receiver interface circuit 14 includes a scatter pointer queue 15 for storing available pointers corresponding to available scattered memory locations 25, and optionally unavailable pointers corresponding to unavailable memory locations 26. More particularly, the unavailable pointers may be used by software being executed by the processor 11 as a record of where received data has been stored. The scatter pointer queue 15 is preferably a circular scatter pointer queue, and the operation thereof will be described further below. Of course, other pointer queues (e.g., a first-in, first-out (FIFO) queue) may also be used in accordance with the present invention as well. Available and unavailable pointers are illustratively shown in FIG. 2, in which the available pointers are labeled A(1)–A(N) and the unavailable pointers are labeled U(1)–U(N). In the illustrated example, each of the pointers represents an address of a corresponding scattered memory location 13 in the memory 12.

The receiver interface circuit 14 also includes a receiver 16 for receiving the data (e.g., from a network) and writing the received data to the available scattered memory locations 25 based upon the available pointers A(1)–A(N) in the scatter pointer queue 15. More particularly, the receiver 16 illustratively includes receive logic 17 for receiving the incoming data, and a controller 18 for determining a next available pointer from the scatter pointer queue 15 and writing the received data to an available scattered memory location 25 corresponding to the next available pointer. In the example illustrated in FIG. 2, the next available pointer is A(1), which is read by the controller 18.

The receiver interface circuit 15 may further include a receiver buffer 22 coupled to the receive logic 17 for temporarily storing the received data until it can be transferred to the memory 12 via the bus 19. Moreover, a bus interface circuit 23 is also included in the receiver interface circuit 14 for coupling the receiver 16 and the scatter pointer queue to the bus 19, as will be appreciated by those skilled in the art.

The computer system may include a direct memory access (DMA) controller 21, for example, coupled to the controller 18 and the memory 12 via the bus 19 for transferring the received data to respective available scattered memory locations 13. That is, upon reading the next available pointer from the scatter pointer queue 15, the controller 18 causes the received data to be written to the respective available memory location 25 by instructing the DMA controller 21 to transfer the received data from the receiver buffer 22 to this available memory location.

When a circular scatter pointer queue 15 is used, the controller 18 may then read the next address in the scatter pointer queue to locate the next available pointer. The receiver interface circuit 14 may be implemented in a field programmable gate array (FPGA) or an application specific integrated circuit (ASIC), for example, though other components or discrete devices may also be used, as will be appreciated by those of skill in the art.

The processor 11 also is coupled to the receiver interface circuit 14 via the bus 19. Based upon software instructions, the processor 11 advantageously changes each unavailable pointer in the scatter pointer queue 15 to an available pointer based upon processing data stored in a respective unavailable scattered memory location 26. As illustratively shown in FIG. 2, for example, it may be seen that the data stored in the unavailable memory location 26 having a pointer U(N–1) has been transferred to the processor 11 for processing. Thereafter, the processor 11 will cause the unavailable pointer U(N–1) in the scatter pointer queue 15 to be changed to an available pointer, as illustratively shown by the arrow pointing to the unavailable pointer U(N–1) in FIG. 2. Thus, the controller 18 will subsequently identify this pointer as an available pointer and cause newly received data to be written to the respective (i.e, the same) memory location 13.

As noted above, the data may be transmitted according to a particular format or protocol and received in groups (or packets) of a predetermined group size. It is possible that other devices connected to the network may send data groups to the computer system 10 which exceed the predetermined group size. In such cases, the receiver 16 may truncate each group of data exceeding the predetermined group size. Alternately, the receiver 16 may instead write the group of data to a plurality of available memory locations 25, rather than a single location, if desired.

Figure 3:
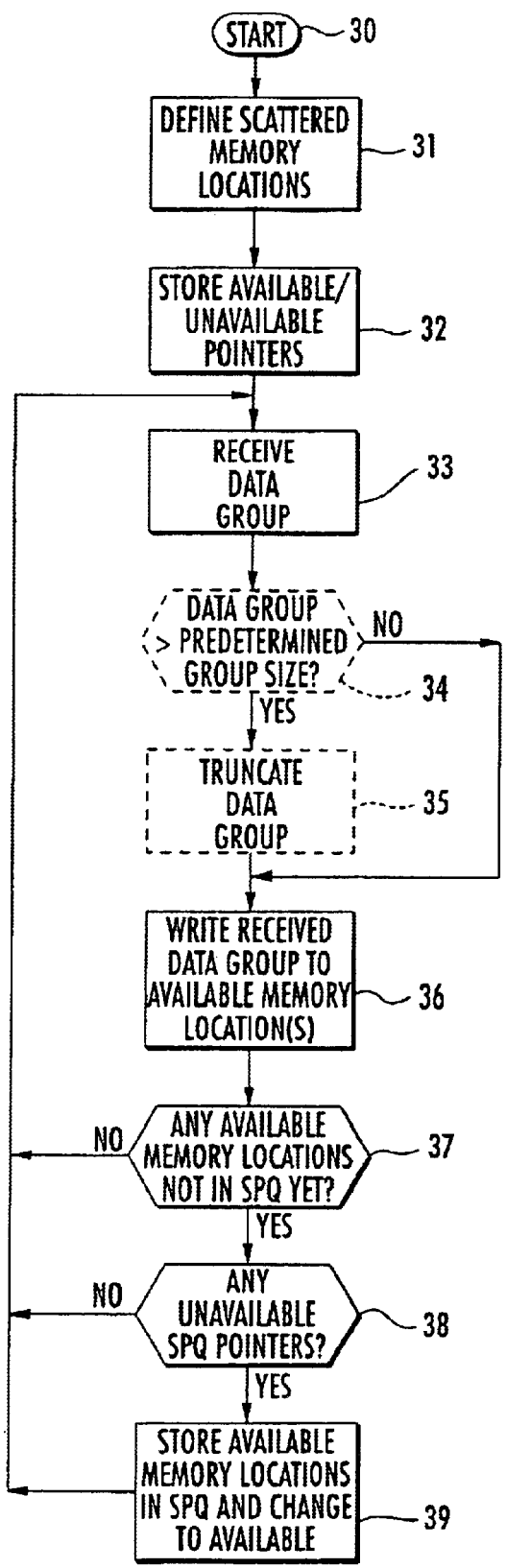
FIG. 3 is a flow diagram of a method of writing data to a memory according to the present invention.

A method aspect of the invention for writing data to at least one memory 12 will now be described with further reference to the flow chart of FIG. 3. The method begins (Block 30) by defining or considering a plurality of scattered memory locations 13 in the memory 12, at Block 31. Each of the scattered memory locations 13 has a pointer associated therewith, as noted above. Furthermore, the method may also include storing available pointers corresponding to available scattered memory locations 25 and unavailable pointers corresponding to unavailable memory locations 26 in the scatter pointer queue 15, at Block 32. By way of example, the processor 11 may write the pointers to the scatter pointer queue 15 in conjunction with defining the scattered memory locations 13 upon initialization or startup of the computer system 10.

Once the scattered memory locations 13 are defined and the pointers have been written into the scatter pointer queue 15, the receiver interface circuit 14 may begin receiving data from a network or other data source, at Block 33. As noted above, the data may be transmitted in groups, and the received groups of data may potentially be larger than a predetermined group size defined for the memory locations 13. Thus, the method may optionally include determining whether each received group of data is greater than the predetermined group size, at Block 34. If so, the controller 18 may optionally truncate each group of data exceeding the predetermined group size, at Block 35. Alternately, the controller may cause each group of data exceeding the predetermined group size to be written to a plurality of available memory locations 25, at Block 36. Of course, if a given group of data does not exceed the predetermined group size, then the group of data would simply be written to the next available memory location 25 (Block 36).

Additionally, the method may also include determining whether data at an unavailable memory location 26 has been processed by the processor 11, at Block 37. If the processor 11 has already processed the data at an unavailable memory location 26, it may then determine a next unavailable pointer in the scatter pointer queue and change the next unavailable pointer to an available pointer corresponding to the newly available memory location, at Blocks 38 and 39.

It should be noted that while the steps illustrated at Blocks 37 through 39 are not necessarily dependent upon preceding steps in the method. That is, although these steps have been shown sequentially in FIG. 3 for clarity of illustration and explanation, the steps illustrated at Blocks 31, 32, 37, 38 and 39 are controlled by the processor 11, while the other steps are controlled by the receiver interface circuit 14, and one may perform its operations independently from the other.

The above described computer system 10 and method according to the present invention therefore advantageously provide relatively quick and efficient data transfer to memory locations or buffers without storing buffer addresses in the system memory. That is, with prior art receiver interface circuits which store available pointer lists in system memory, available pointer values will have to be uploaded to the receiver interface circuit on a continual basis, which may result in significant transfer delays. Further, the receiver interface circuit 10 of the present invention may require less complicated architecture and software design with respect to prior art linked list devices since there is no linked list that must be followed or searched.

It should also be noted that the receiver interface circuit 15 of the present invention may also advantageously be used in numerous applications other than as a network interface controller for a computer system. By way of example, the receiver interface circuit 15 may be used to receive data from disk drives or other electronic devices. Additional applications will also be appreciated by those of skill in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer system comprising:
   a processor;
   at least one memory coupled to said processor and having a plurality of scattered memory locations each having a pointer associated therewith; and
   a receiver interface circuit coupled to said at least one memory and said processor and comprising:
      a scatter pointer queue for storing available pointers corresponding to available scattered memory locations and unavailable pointers corresponding to unavailable scattered memory locations, and
      a receiver for receiving data and writing the received data to the available scattered memory locations based upon the available pointers in said scatter pointer queue;
   said processor changing unavailable pointers in said scatter point queue to available pointers based upon processing data stored in unavailable scattered memory locations.

2. The computer system of claim 1 wherein said scatter pointer queue comprises a circular scatter pointer queue.

3. The computer system of claim 1 further comprising a direct memory access (DMA) controller coupled to said receiver and said at least one memory for transferring the received data to respective available scattered memory locations.

4. The computer system of claim 1 further comprising a bus coupling said processor, said at least one memory, and said receiver interface circuit together.

5. The computer system of claim 4 wherein said receiver interface circuit comprises a bus interface circuit coupling said receiver and said scatter pointer queue to said bus.

6. The computer system of claim 1 wherein said receiver further comprises:
   receive logic for receiving the data; and
   a controller coupled to said receive logic for determining a next available pointer from said scatter pointer queue and writing the received data to an available scattered memory location corresponding to the next available pointer.

7. The computer system of claim 1 wherein said receiver interface circuit further comprises a buffer coupled to said receiver for storing the received data.

8. The computer system of claim 1 wherein the data is transmitted in groups, and wherein said receiver truncates each group of data exceeding a predetermined group size.

9. The computer system of claim 1 wherein the data is transmitted in groups, and wherein when a group of data exceeds a predetermined group size said receiver writes the group of data to a plurality of available memory locations.

10. The computer system of claim 1 wherein said receiver interface circuit is implemented in at least one of a field programmable gate array (FPGA) and an application specific integrated circuit (ASIC).

11. A computer system comprising:

a bus;

a processor and at least one memory coupled to said processor by said bus, said at least one memory having a plurality of scattered memory locations each having a pointer associated therewith; and a receiver interface circuit coupled to said at least one memory and said processor by said bus and comprising
a circular scatter pointer queue for storing available pointers corresponding to available scattered memory locations and unavailable pointers corresponding to unavailable scattered memory locations, and
a receiver for receiving data and writing the received data to the available scattered memory locations based upon the available pointers in said circular scatter pointer queue;

said processor changing unavailable pointers in said circular scatter pointer queue to available pointer based upon processing data stored in unavailable scattered memory locations.

12. The computer system of claim 11 further comprising a direct memory access (DMA) controller coupled to said receiver and said at least one memory by said bus for transferring the received data to respective available scattered memory locations.

13. The computer system of claim 11 wherein said receiver interface circuit comprises a bus interface circuit coupling said receiver and said circular scatter pointer queue to said bus.

14. The computer system of claim 11 wherein said receiver further comprises:

receive logic for receiving the data; and a controller coupled to said receive logic for determining a next available pointer from said circular scatter pointer queue and writing the received data to an available scattered memory location corresponding to the next available pointer.

15. The computer system of claim 11 wherein said receiver interface circuit further comprises a buffer coupled to said receiver for storing the received data.

16. The computer system of claim 11 wherein the data is transmitted in groups, and wherein said receiver truncates each group of data exceeding a predetermined group size.

17. The computer system of claim 11 wherein the data is transmitted in groups, and wherein when a group of data exceeds a predetermined group size said receiver writes the group of data to a plurality of available memory locations.

18. The computer system of claim 11 wherein said receiver interface circuit is implemented in at least one of a field programmable gate array (FPGA) and an application specific integrated circuit (ASIC).

19. A receiver interface circuit to be coupled to at least one memory having a plurality of scattered memory locations each having a pointer associated therewith, the receiver interface circuit comprising:

a scatter pointer queue for storing available pointers corresponding to available scattered memory locations, and for storing unavailable pointers corresponding to unavailable memory locations to be changed to available pointers based upon processing of data stored in the unavailable scattered memory locations; and a receiver for receiving the data and writing the received data to the available scattered memory locations based upon the available pointers in said scatter pointer queue.

20. The receiver interface circuit of claim 19 wherein said scatter pointer queue comprises a circular scatter pointer queue.

21. The receiver interface circuit of claim 19 wherein the data is transmitted in groups, and wherein said receiver truncates each group of data exceeding a predetermined group size.

22. The receiver interface circuit of claim 19 wherein the data is transmitted in groups, and wherein when a group of data exceeds a predetermined group size said receiver writes the group of data to a plurality of available memory locations.

23. The receiver interface circuit of claim 19 wherein the receiver interface circuit is to be coupled to the least one memory by a bus; and wherein the receiver interface circuit further comprises a bus interface circuit for coupling said receiver and said scatter pointer queue to the bus.

24. The receiver interface circuit of claim 19 wherein said receiver further comprises:

receive logic for receiving the data; and a controller coupled to said receive logic for determining a next available pointer from said scatter pointer queue and writing the received data to an available scattered memory location based upon the next available pointer.

25. The receiver interface circuit of claim 19 further comprising a buffer coupled to said receiver for storing the received data.

26. The receiver interface circuit of claim 19 wherein the receiver interface circuit is implemented in at least one of a field programmable gate array (FPGA) and an application specific integrated circuit (ASIC).

27. A method for writing data to at least one memory comprising a plurality of scattered memory locations, each memory location having a pointer associated therewith, the method comprising:

storing available pointers corresponding to available scattered memory locations and storing unavailable pointers corresponding to unavailable memory locations in the scatter pointer queue;

writing the data to the available scattered memory locations based upon the available pointers in the scatter pointer queue; and changing unavailable pointers in the scatter pointer queue to available pointers based upon data stored in unavailable scattered memory locations being processed.

28. The method of claim 27 wherein the scatter pointer queue comprises a circular scatter pointer queue.

29. The method of claim 27 wherein the data is transmitted in groups, and further comprising truncating each group of data exceeding a predetermined group size.

30. The method of claim 27 wherein the data is transmitted in groups, and wherein writing comprises writing a group of data to a plurality of available memory locations when the group of data exceeds a predetermined group size.

* * * * *